(12) United States Patent
Häuser et al.

(10) Patent No.: US 11,821,560 B2
(45) Date of Patent: Nov. 21, 2023

(54) FLUID MANIFOLD APPARATUS, IN PARTICULAR WATER DISTRIBUTION APPARATUS

(71) Applicant: Minebea Mitsumi, Inc., Nagano (JP)

(72) Inventors: Eric Häuser, Villingen-Schwenningen (DE); Christian Schmid, Eisenbach (DE); Robert Rottweiler, Rottweil (DE); Vladimir Popov, Villingen-Schwenningen (DE); Alexander Zwetkow, Rottweil (DE)

(73) Assignee: Minebea Mitsumi Inc., Nagano (JP)

( * ) Notice: Subject to any disclaimer, the term of this patent is extended or adjusted under 35 U.S.C. 154(b) by 57 days.

(21) Appl. No.: 17/536,192

(22) Filed: Nov. 29, 2021

(65) Prior Publication Data
US 2022/0170578 A1  Jun. 2, 2022

(30) Foreign Application Priority Data

Dec. 1, 2020 (DE) .......................... 102020131829.4
Sep. 29, 2021 (DE) .......................... 102021125260.1

(51) Int. Cl.
*F16L 41/03* (2006.01)
*F16K 31/524* (2006.01)

(52) U.S. Cl.
CPC ........ *F16L 41/03* (2013.01); *F16K 31/52408* (2013.01)

(58) Field of Classification Search
CPC .... F16L 41/03; F16K 31/52408; F16K 11/16; F16K 11/161; F16K 11/166
See application file for complete search history.

(56) References Cited

U.S. PATENT DOCUMENTS

| 2,539,221 | A | * | 1/1951 | Badeaux | ............... | F16K 31/524 |
| | | | | | | 137/868 |
| 3,794,061 | A | * | 2/1974 | Horvath | .................... | C02F 1/42 |
| | | | | | | 137/330 |
| 4,846,138 | A | * | 7/1989 | Vallejos | .................... | F01L 3/20 |
| | | | | | | 123/188.3 |
| 2015/0041007 | A1 | * | 2/2015 | Kawasaki | ......... | F16K 31/52416 |
| | | | | | | 137/625.11 |

* cited by examiner

*Primary Examiner* — Reinaldo Sanchez-Medina
*Assistant Examiner* — Nicole Gardner
(74) *Attorney, Agent, or Firm* — Grossman, Tucker, Perreault & Pfleger PLLC; Steven J. Grossman

(57) ABSTRACT

A fluid manifold apparatus, in particular a water distribution apparatus, comprises a fluid chamber, at least one fluid inlet, a plurality of fluid outlets, and a manifold unit, including a plurality of valve units for closing the fluid outlets and a camshaft supported to be rotatable about a rotary axis, comprising a plurality of lobes for operating the valve units, wherein each of the valve units has a cam follower and a sealing unit, and the lobes of the camshaft are provided to lift the cam followers of the valve units as a function of a rotary position of the camshaft.
Each of the cam followers has a receiver for receiving one sealing unit, wherein the sealing units are arranged to be linearly moveable in the receivers.

15 Claims, 7 Drawing Sheets

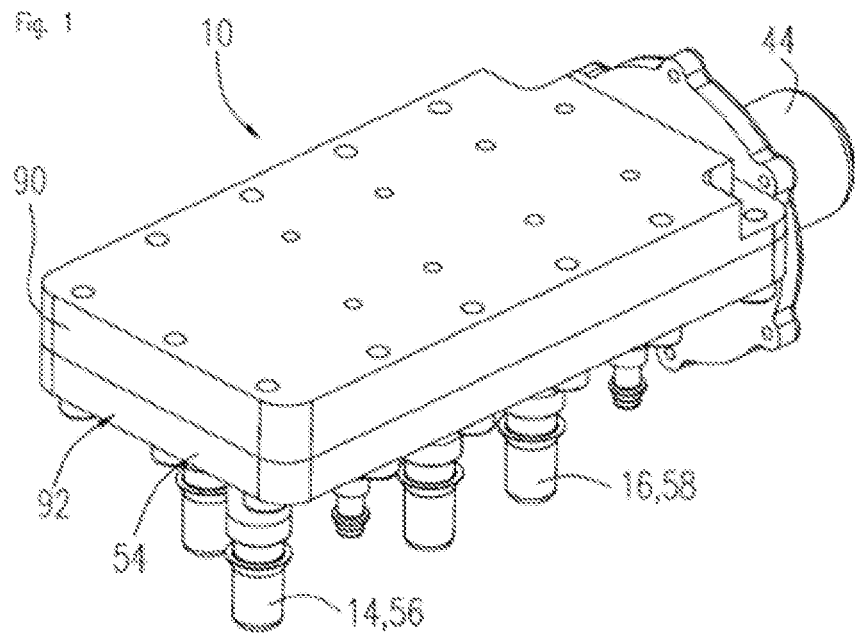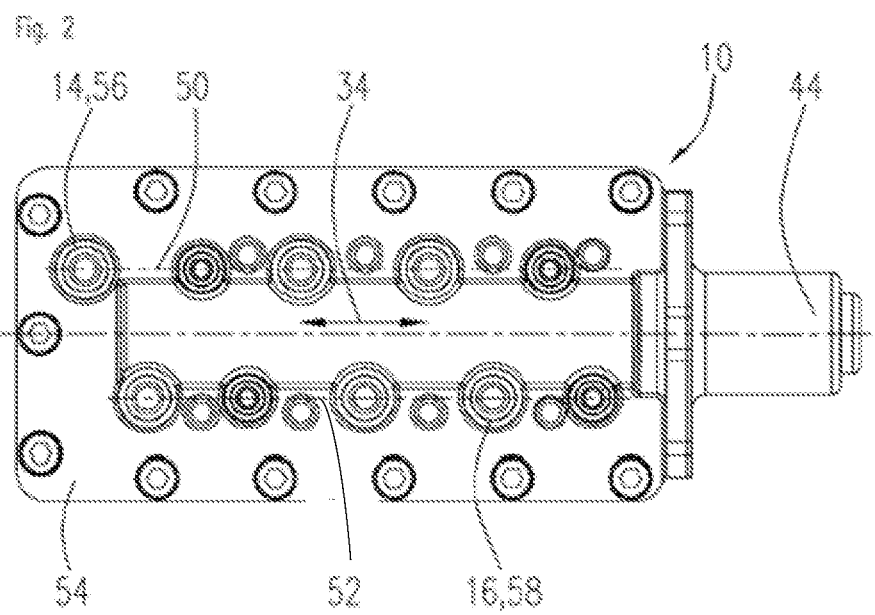

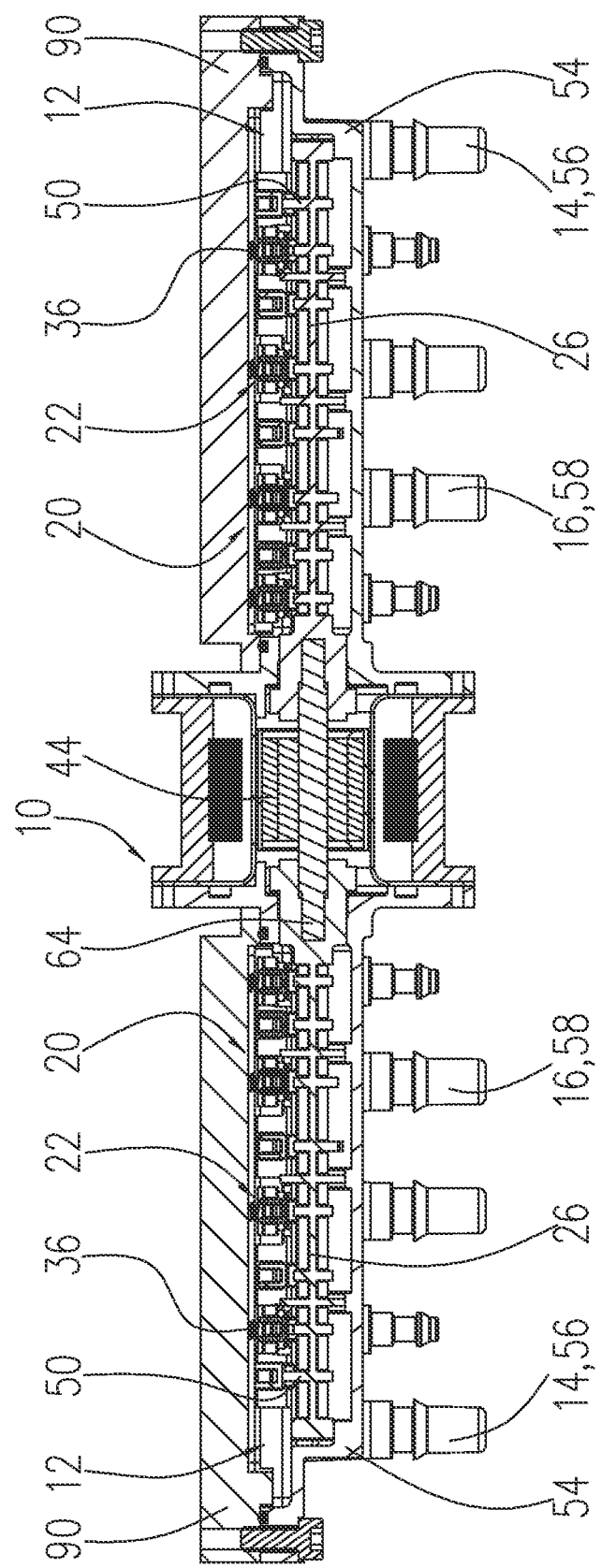

FLUID MANIFOLD APPARATUS, IN PARTICULAR WATER DISTRIBUTION APPARATUS

BACKGROUND

DE 10 2018 118 828 A1 describes a fluid manifold apparatus, in particular a water distribution apparatus, comprising a fluid chamber, a fluid inlet and a plurality of fluid outlets. The fluid manifold comprises a manifold unit including a plurality of valve units for closing the fluid outlets and a camshaft supported to be rotatable about a rotary axis. The camshaft includes a plurality of lobes for operating the valve units, wherein each of the valve units has a cam follower and a sealing unit and the lobes of the camshaft are provided to lift the cam followers of the valve elements as a function of a rotary position of the camshaft.

A generic fluid manifold apparatus, in particular a water distribution apparatus, is to be provided with precise and secure opening and closing of the fluid outlets.

SUMMARY

A fluid manifold apparatus, in particular a water distribution apparatus, according to one aspect comprises a fluid chamber, at least one fluid inlet, a plurality of fluid outlets, and a manifold unit including a plurality of valve units for closing the fluid outlets and a camshaft supported to be rotatable about a rotary axis, having a plurality of lobes for operating the valve units, wherein each of the valve units has a cam follower and a sealing unit and the lobes of the camshaft are provided to lift the cam followers of the valve elements as a function of the rotary position of the camshaft.

Each of the cam followers may have a receiver for receiving one sealing unit, wherein the sealing units may be arranged to be linearly moveable in the receivers.

In the present context a "fluid manifold apparatus" is understood to be, in particular, an apparatus provided to distribute a fluid flow to a plurality of consumers and/or to redirect the fluid flow to at least one of a plurality of consumers. "Provided" is to mean, in particular, specially programmed, designed and/or equipped. The fact that an object is provided for a particular function, is to mean that the object fulfils and/or performs this particular function in at least one state of application and/or operation. In particular, the fluid manifold apparatus is formed as a water distribution apparatus, which is provided to distribute a water flow to a plurality of consumers and/or to redirect the water flow to at least one of the plurality of consumers. In particular, the fluid manifold apparatus can be provided for use in a washer fluid distribution system and/or a cooling water system of an automotive vehicle.

The fluid manifold apparatus may comprise a fluid chamber which is provided to at least temporarily receive the fluid to be distributed. In particular, the fluid to be distributed flows through the fluid chamber during the operation of the fluid manifold apparatus. Preferably, the fluid chamber, permanently, is at least essentially entirely filled by the fluid to be distributed during the operation of the fluid manifold apparatus. The fluid chamber can have an at least essentially rectangular cross-section. The fluid manifold apparatus has at least one housing, which at least partially forms a side wall of the fluid chamber. The housing can be formed, in particular, at least essentially to be cuboid-shaped and can enclose, in particular, a largely cuboid volume.

The fluid manifold apparatus may include at least one fluid inlet, which is provided to feed the fluid to be distributed into the fluid chamber. Alternatively, the fluid manifold apparatus can also include a plurality of fluid inlets. The fluid inlet may opens out directly into the fluid chamber. The fluid inlet can be arranged at a position on the housing of the fluid manifold apparatus deemed suitable by the person skilled in the art. In particular, the fluid inlet may have at least one connecting piece protruding out from the housing, which is provided for connection of a fluid line, which is connected to a fluid source.

Furthermore, the fluid manifold apparatus may include a plurality of fluid outlets, which are provided to discharge the fluid to be distributed from the fluid chamber. The fluid outlets may be arranged, in particular, on a base of the housing of the fluid manifold apparatus, for example on an underside of the housing. Alternatively, the fluid outlets can also be arranged on all housing sides in the circumferential direction of the camshaft. In particular, each of the fluid outlets may have at least one connecting piece protruding out from the housing, which is provided for connection of a fluid line leading to a consumer. The fluid outlets may open out directly into the fluid chamber. The fluid outlets, in particular in an opening region, may have an at least essentially circular cross-section. In particular, the openings of the fluid outlets may have a circular shape. In the opening region, the fluid outlets may be at least essentially flush with the inner side wall of the fluid chamber. Fluid outlets not used can be closed off, for example, by means of stoppers.

The fluid manifold apparatus also may have a manifold unit, which is provided to close off or open the fluid outlets. The manifold unit may include a plurality of valve units which are provided to close off the fluid outlets by blocking and/or obstructing the openings of the fluid outlets in an essentially fluid-tight, in particular, watertight manner. Each of the valve units may comprise a cam follower and a sealing unit. The valve units may be arranged for example entirely within the fluid chamber. The valve units may be at least partially and may be entirely of a material that is insensitive to the fluid to be distributed, for example, of brass, a stainless steel, a ceramic or a plastic material. Alternatively, the valve units can also be at least partially or entirely of a material combination, for example of a coated, for example, plastic-coated metal, for example steel or brass. For example, each fluid outlet may have precisely one of the valve units associated with it. The number of valve units may correspond to the number of fluid outlets.

The manifold unit may include a camshaft, which is provided to change a position of the valve units to change the fluid distribution. The camshaft may be arranged entirely within the fluid chamber. The camshaft may be provided to change each position of one or more of the valve units, while the position of the other valve units remains unchanged. The camshaft may include a plurality of lobes, wherein the number of lobes corresponds, in particular, to the number of valve units. Each valve unit may have one lobe of the camshaft associated with it. The camshaft may be supported to be rotatable about a rotary axis, wherein the rotary axis may extend essentially perpendicular to a discharge direction of the fluid outlets. As the camshaft rotates, the lobes act on the cam followers of the valve units as a function of the rotary position of the camshaft, causing the sealing unit of the valve units to be lifted off the fluid outlets and thus causing the fluid outlets to open. The lobes of the camshaft may be provided to cause a tilting motion of the cam followers of the valve units. For example, the lobes of the camshaft may be provided, as the camshaft rotates, to apply a force to the cam followers of the valve units, which causes a tilting motion of the cam followers of the valve units. In particular, the force acting on the cam followers of the valve units may be dependent on a rotary position of the camshaft and a resulting position of the lobes of the camshaft. The lobes of the camshaft can may work indirectly or directly together with the cam followers of the valve units. A lowering motion may be directed into the interior of the fluid chamber. For example, the camshaft can be manually and/or automatically driven. The camshaft may be formed to be bidirectionally rotatable. Alternatively, the camshaft can also be formed, however, to be only unidirectionally rotatable.

The lobes of the camshaft may be arranged on the circumference of the camshaft in such a manner that at each rotational position of the camshaft, the sealing element of one or more of the valve units is lifted and thus one or more of the fluid outlets is open. For example, the lobes of the camshaft may be arranged on the circumference of the camshaft in such a manner that a maximum of one sealing element of one of the valve units is lifted with each rotational position of the camshaft and thus only one of the fluid outlets is open at any one time. For example, the lobes may be arranged on the camshaft offset with respect to each other in the circumferential direction. The lobes may be arranged in the circumferential direction of the camshaft to be equidistant with respect to each other. An angular distance between the lobes of the camshaft. For example dependent on a number of lobes and/or on a number of fluid outlets.

Furthermore, the fluid outlets may be offset from the rotary axis of the camshaft. For example, the fluid outlets may be arranged along an axial direction of the camshaft offset to the rotary axis of the camshaft. In one example, the fluid outlets are arranged in two rows, which extend on opposite sides of the camshaft at least essentially parallel to the rotary axis of the camshaft. "Essentially parallel" is taken to mean here, in particular, an orientation of the direction relative to a reference direction, in particular in one plane, wherein the direction with respect to the reference direction has a deviation, in particular, of less than 8°, or of less than 5°, or even less than 2°. The fluid outlets of the first rows may be arranged along an axial direction of the camshaft offset to the fluid outlets of the second rows. This helps to achieve an compact structure, in particular, a short structural length, of the fluid manifold apparatus. The valve units may be arranged corresponding to the arrangement of the fluid outlets along the axial direction in the fluid chamber. Each fluid outlet may have one valve unit associated with it. A distance between the lobes of the camshaft along the axial extension of the camshaft may at least essentially correspond to a distance of the valve units as seen along the axial extension of the camshaft.

For example, the cam followers of the valve units may be supported to be tiltable about a tilting axis at one end. On each end opposite to the tilting axis of the cam followers, a receiver for receiving a sealing unit may be arranged. The receivers may be annular, in particular circular in configuration. Alternatively, the receivers can have, for example, a fork-like configuration. The lobes of the camshaft, for tilting the cam followers, may cooperate with an operating contour integrally formed on the cam followers, arranged between each tilting axis and receiver. The receivers may be integrally formed with the cam followers of the valve units. "Integrally formed" in the present context, is to mean, in particular, adhesively or weld-connected, for example by means of a welding process, an adhesive process, an integral molding process and/or another process deemed suitable by the person skilled in the art, and/or formed in one piece, for example by means of manufacturing it as one casting and/or by manufacturing it in a one- or more-component injection molding process and preferably from a single blank. Each of the receivers may be provided for receiving one sealing unit, wherein the sealing units may be arranged to be linearly moveable within the receivers. As a cam follower of a valve unit is tilted about the tilting axis by a lobe of the camshaft, the tilting motion may be transmitted to the sealing unit of the valve unit by the receiver of the cam follower and thus a lifting motion of the sealing unit may be caused.

Such an example can provide a generic fluid manifold apparatus, in particular, a water distribution apparatus, having useful properties with respect to precise and secure opening and closing of the fluid outlets. In particular, a mechanical decoupling can be achieved between the lifting function of the cam followers and the sealing function of the sealing units.

Each of the sealing units may have a cylindrical seal carrier, which is provided for arrangement within the receiver of each cam follower, and has a seal arranged on the seal carrier. The seal carrier may be formed of a plastic material or of a metal, for example of brass. An outer diameter of the cylindrical seal carrier of the sealing units may be smaller than an inner diameter of the receivers of the lifting elements, thus ensuring linear moveability of the seal carrier within the receiver of a cam follower. For example, the seals of the sealing units may be formed to be disc-shaped and have a circumferential sealing lip which, in the sealing state, may be provided to fully enclose in the circumferential direction a fluid outlet to be closed. The seals may be formed of an elastomeric material. Each seal may be arranged on a base surface of the seal carrier facing each fluid outlet. For example, the seals can be adhesively glued to the base of the seal carrier facing the fluid outlets. Each of the sealing units may have an engagement collar, which is arranged on an end of the seal carrier opposite to the seal and having an outer circumference larger than the inner circumference of the receivers of the cam followers. When the cam follower is tilted to open a fluid outlet, an end face of the respective receiver facing the engagement collar of the respective sealing unit may engage the engagement collar after a predefined tilting angle, thus causing a lifting motion of the seal carrier of the sealing unit as the tilting is continued. In a closed state of the sealing units, the end faces of the receivers facing the engagement collar may extend obliquely to the engagement collars of each of the sealing units, so that, during a lifting motion, the seal carriers may be at first only lifted at one side thus enabling easy lifting of the sealing unit and, in particular, enabling any suction action of the seals to be prevented.

Each of the valve units may have at least one spring element, which is provided to apply a spring force to the seal carrier of each sealing unit acting in the direction of the fluid outlet. This helps to achieve secure closing of the fluid outlets by the sealing units. For example, each sealing unit may have one spring element associated with it. The spring elements may be formed, in particular, as helical springs. The seal carriers may have a cylindrical recess for partially receiving a spring element, in particular, an end of a spring element. The ends of the spring elements opposite the seal carriers may be supported on a lid of the fluid chamber. The lid of the fluid chamber can include a plurality of recesses, in particular cylindrical recesses, for receiving the ends of the spring elements opposite the seal carriers. The lobes of the camshaft may be provided to lift the sealing units of the valve units against the spring force by means of tilting the cam followers of the valve units. For example, the cam followers of the valve elements cooperating with the lobes of the camshaft may be provided to indirectly or directly apply a force acting against the spring force to the sealing units to open the fluid outlets. Lifting a sealing unit, as the fluid outlet is opened, may be performed directly by the cam follower of the valve unit against the spring force of the spring element of the sealing unit. Lowering of a sealing unit, as the fluid outlet is closed, may be exclusively caused by the spring force of the spring element acting on the sealing unit, wherein the receiver of the cam follower only performs guiding of the sealing unit during lowering.

Each of the cam followers may have an operating contour which is provided to cooperate with a lobe of the camshaft, wherein the operating contour has a leading ramp, a trailing ramp and an at least partially convex lifting region facing towards the camshaft. For example, a convex portion of the lifting region may protrude into a lobe-height circle of the lobes of the camshaft. A "lobe-height circle" may be the circle which a tip of a lobe describes during a revolution of the camshaft. The lifting region may have the shape of a shortened cycloid. The leading ramp and the trailing ramp at least partially may extend tangentially to the lobe-height circle of the lobes of the camshaft. This helps to achieve shock-free lifting and/or lowering of the sealing units.

Furthermore, the manifold unit may have an electric motor, which is provided to rotationally drive the camshaft. This enables an automatic driving of the camshaft. The electric motor may be configured as an inner rotor motor. Alternatively, the electric motor can also be configured as an outer rotor motor. The electric motor has a stator and a rotor, wherein the camshaft may be connected to the rotor of the electric motor in a torsion-resistant manner. The camshaft may be connected to the rotor of the electric motor by a frictional and/or interlocking connection, for example, by means of a snap engagement and/or a screw or bolt connection. Alternatively, the camshaft can be integrally formed with the rotor of the electric motor. The rotor of the electric motor may consist, for example, of plastic-bound magnets and/or sintered magnets. Furthermore, the manifold unit may include at least one control electronics for controlling the electric motor. The control electronics may be arranged outside of the fluid chamber.

The manifold unit may have a sensor unit which is provided to detect a rotary position of the camshaft. This can determine a position of the lobes of the camshaft and thus positions of open or closed fluid outlets. In particular, the sensor unit can comprise, for example, an incremental rotary encoder, an absolute rotary encoder, a potentiometer, a capacitive or even an inductive sensor and/or resolver. In particular, the sensor unit can be provided to detect and/or determine the rotary position of the camshaft directly or via a rotary position of the rotor of the electric motor. In particular, the sensor unit can comprise Hall sensors, which are provided to detect a rotary position of the rotor of the electric motor. To do this, the rotor can have a magnetization on a side facing the Hall sensors, which is detected by the Hall sensors and used by an evaluation electronics to determine the rotary position of the rotor. Alternatively or additionally, the sensor unit can be provided to directly detect a position of the valve elements, such as by capacitive, inductive means and/or by means of force sensors. The sensor unit can be at least partially integrated, in particular, into a control electronics of the electric motor.

Furthermore, according to a further aspect, a fluid distribution system, in particular a washer fluid distribution system of an automotive vehicle, is provided comprising at least one fluid manifold apparatus as detailed above. This can help to achieve distribution of a fluid within a fluid distribution system. In particular, the fluid distribution system, in addition to the fluid manifold device, can have at least one fluid tank to provide the fluid, at least one fluid pump to pump the fluid and a plurality of consumers of the fluid. In the case of a washer fluid distribution system of an automotive vehicle, the fluid tank can be, in particular, a water tank for receiving washer fluid, the fluid pump can be a water pump, and the consumers can be, for example, a windscreen washer system, a headlamp washer system and/or a sensor cleaning system.

The fluid manifold apparatus is not to be limited to the above-described examples. In particular, to fulfil a functioning principle described herein, the fluid manifold apparatus can have a number of individual elements, components and units deviating from the one stated.

SHORT DESCRIPTION OF DRAWINGS

Further advantages can be derived from the following description of the drawing. In the drawing two examples of this disclosure are shown. The drawing, the description and the claims comprise numerous features in combination. The person skilled in the art will also suitably consider the features individually and combine them to further useful configurations.

In the drawing:

FIG. 1 shows a perspective view of a fluid manifold apparatus according to an example;

FIG. 2 shows a bottom view of the fluid manifold apparatus according to an example;

FIG. 11 shows a section view of a fluid manifold apparatus comprising two fluid chambers according to an example.

DESCRIPTION OF THE EXAMPLES

Figure 3:
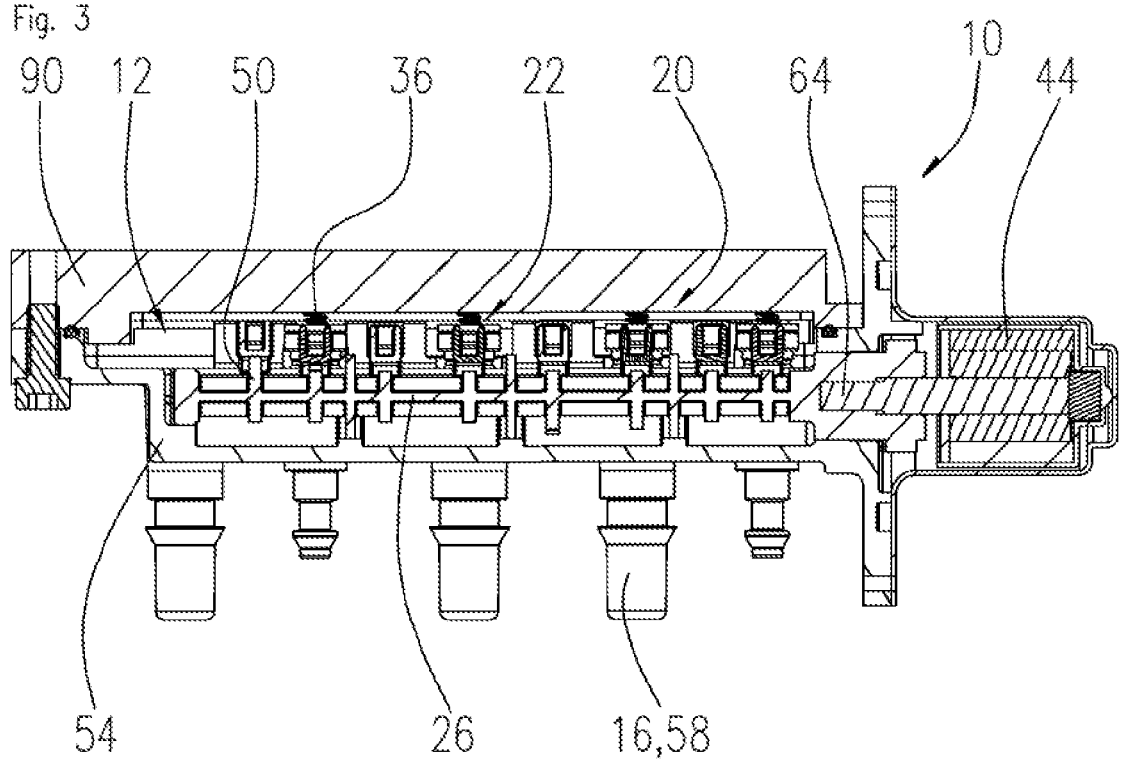
FIG. 3 shows a longitudinal sectional view of the fluid manifold apparatus according to an example.

FIG. 1 shows a perspective view of a fluid manifold apparatus 10. FIG. 2 shows the fluid manifold apparatus 10 in a bottom view. The fluid manifold apparatus 10 is formed, in particular, as a water distributing apparatus. In particular, the fluid manifold apparatus 10 can be provided for use as a washer fluid distributing apparatus in a washer fluid distribution system of an automotive vehicle. The fluid manifold apparatus 10 comprises a bipartite housing 92, comprising a housing tray 54 and a housing lid 90. The fluid manifold apparatus 10 comprises at least one fluid inlet 14, which is provided to feed a fluid to be distributed into the fluid manifold apparatus 10. The fluid inlet 14 is arranged on an underside of the housing tray 54 of the housing 92. The fluid inlet 14 comprises a connecting piece 56 outwardly protruding from the housing tray 54, which is provided for connection to a fluid line connected to a fluid source, not shown here.

Moreover, the fluid manifold apparatus 10 comprises a plurality of fluid outlets 16, which are provided to discharge a fluid to be distributed from the fluid manifold apparatus 10. The fluid outlets 16 are arranged, just like the fluid inlet 14, at the housing tray 54 of the fluid manifold apparatus 10. Each of the fluid outlets 16 has a connecting piece 58 outwardly protruding from the housing tray 54, which is provided for connection to a fluid line, not shown, leading to a consumer. For example, the fluid manifold apparatus 10, in the example shown, has nine fluid outlets 16, wherein a number of fluid outlets 16 can also deviate from the number shown.

FIG. 3 shows a longitudinal sectional view of the fluid manifold apparatus 10. The fluid manifold apparatus 10 has a fluid chamber 12, into which both the fluid inlet 14 and the fluid outlets 16 open. A wall of the fluid chamber 12 is formed by the housing 92 of the fluid manifold apparatus 10. The fluid chamber 12 is provided to receive, at least temporarily, the fluid to be distributed. The fluid to be distributed is fed into the fluid chamber 12 via the fluid inlet 14. In particular, during operation of the fluid manifold apparatus 10, the fluid to be distributed flows through the fluid chamber 12. For example, the fluid chamber 12 is permanently at least essentially entirely filled by the fluid to be distributed.

Figure 4:
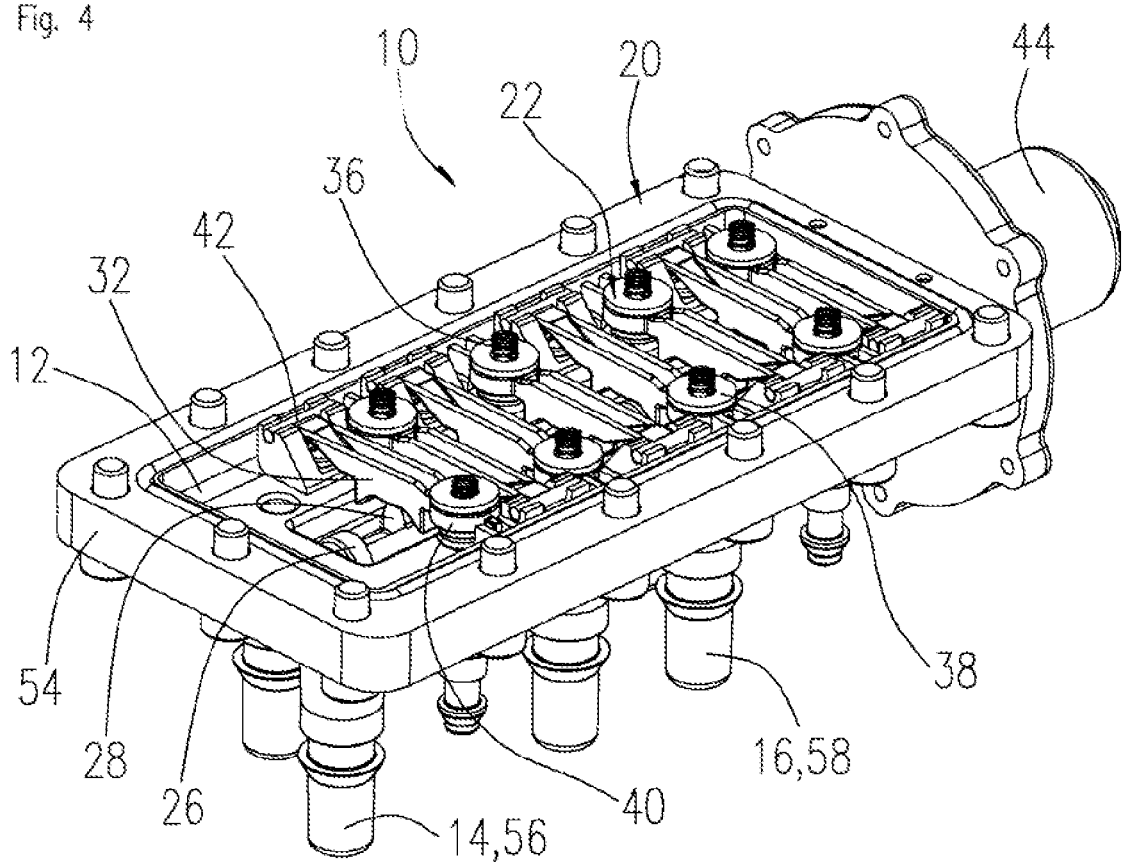
FIG. 4 shows the fluid manifold apparatus with the fluid chamber open according to an example.
Figure 5:
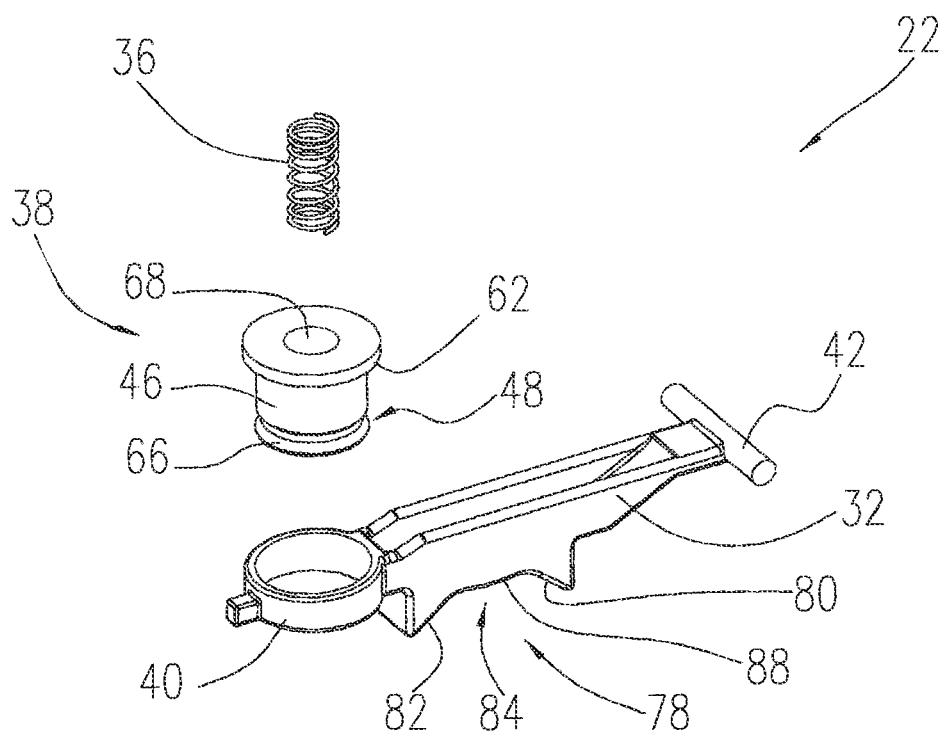
FIG. 5 shows an exploded view of a valve unit according to an example.

Furthermore, the fluid manifold apparatus 10 has a manifold unit 20, which is arranged, at least largely, within the fluid chamber 12. FIG. 4 shows the fluid manifold apparatus 10 with the fluid chamber 12 open. The manifold unit 20 comprises a plurality of valve units 22 for closing the fluid outlets 16. FIG. 5 shows an exploded view of a valve unit 22. Each of the valve units 22 comprises a cam follower 32 and a sealing unit 38. The cam followers 32 are supported on one side to be tilted about a tilting axis 42. The cam followers 32, on each side opposite the tilting axis 42, have a receiver 40. The receiver 40 is provided to receive a sealing unit 38. The receivers 40 may be configured to be annular. The sealing units 38 are arranged to be linearly moveable within the receivers 40. Each of the sealing units 38 has a cylindrical seal carrier 46, which is provided for arrangement within the receiver 40 of a cam follower 32. An outer diameter of the cylindrical seal carrier 46 of the sealing unit 38 is smaller than an inner diameter of the receiver 40 of the cam followers 32 so that a linear moveability of the seal carriers 38 in the receivers 40 is ensured. Moreover, the sealing units 38 have a seal 48 arranged on the seal carrier 46. The seals 48 of the sealing units 38 are formed to be disc-shaped and have a circumferential sealing lip 66. The sealing lip 66 is provided, in the sealing state, to completely enclose, in the circumferential direction, a fluid outlet 16 to be closed. Each of the sealing units 38 also comprises an engagement collar 62, which is arranged on an end of the seal carrier 46 opposite the seal 48, and the outer circumference of which is larger than the inner circumference of the receivers 40 of the cam followers 32. Each of the valve units 22 also comprises a spring element 36, which is provided to apply a spring force to the seal carrier 46 acting in the direction toward the fluid outlets 16. The spring elements 36 are formed, in particular, as helical springs. Each of the seal carriers 46 of the sealing units 38 has a recess 68, which is provided to receive one end of a spring element 36.

Figure 6:
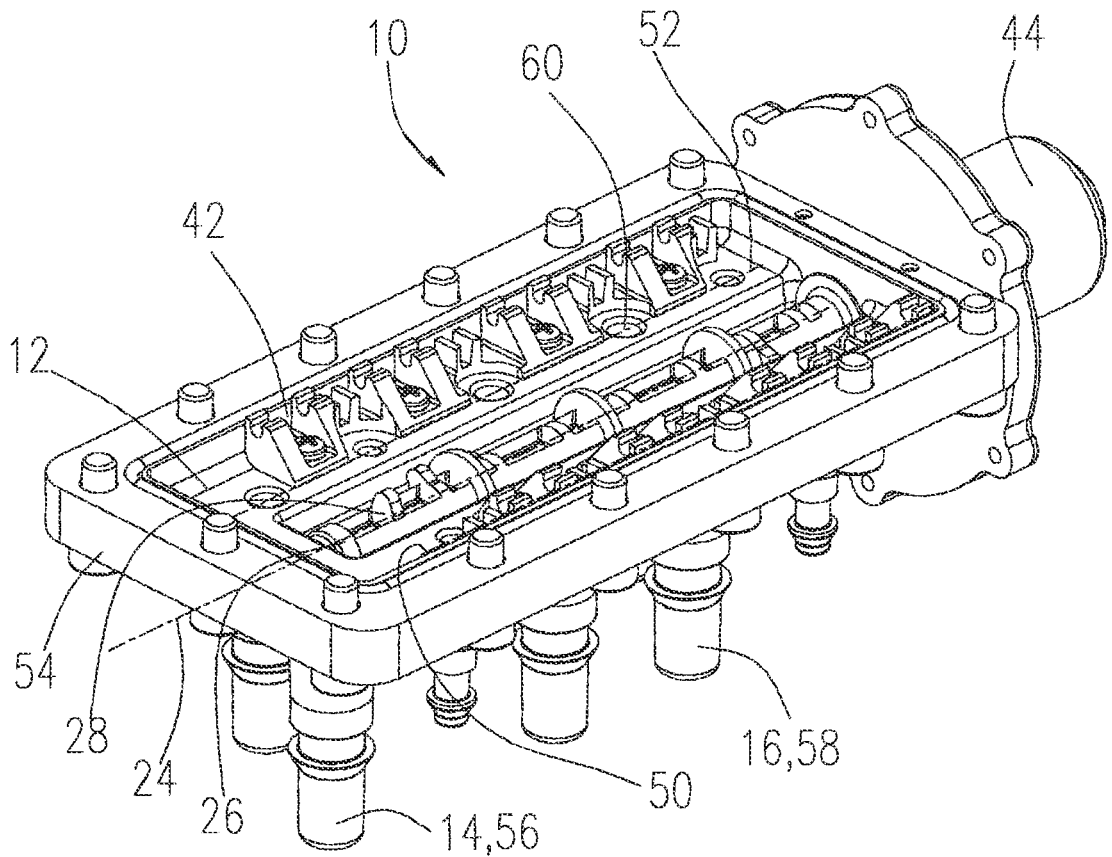
FIG. 6 shows the fluid manifold apparatus with the fluid chamber open and valve elements removed according to an example.

FIG. 6 shows the fluid manifold apparatus 10 with the fluid chamber 12 open and valve units 22 removed. The fluid outlets 16 have an at least essentially circular opening 60 on the side of the fluid chamber. The valve units 22 are provided to close the fluid outlets 16 in an essentially fluid-tight, in particular watertight, manner by blocking the openings 60. In an opening region, the fluid outlets 16 are at least essentially flush with an inner side wall of the fluid chamber 12.

Figure 7:
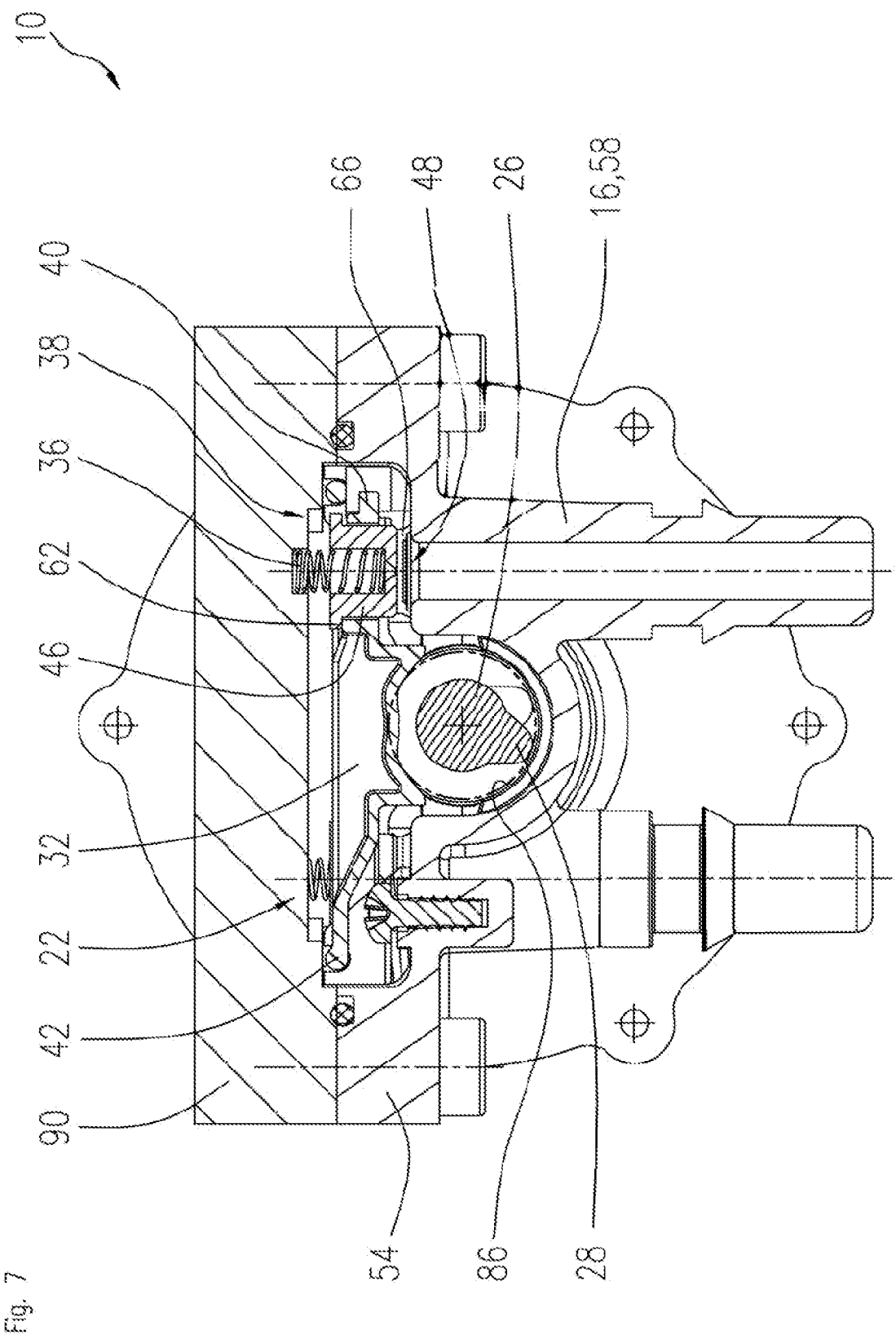
FIG. 7 shows a valve unit in the closed position according to an example.
Figure 8:
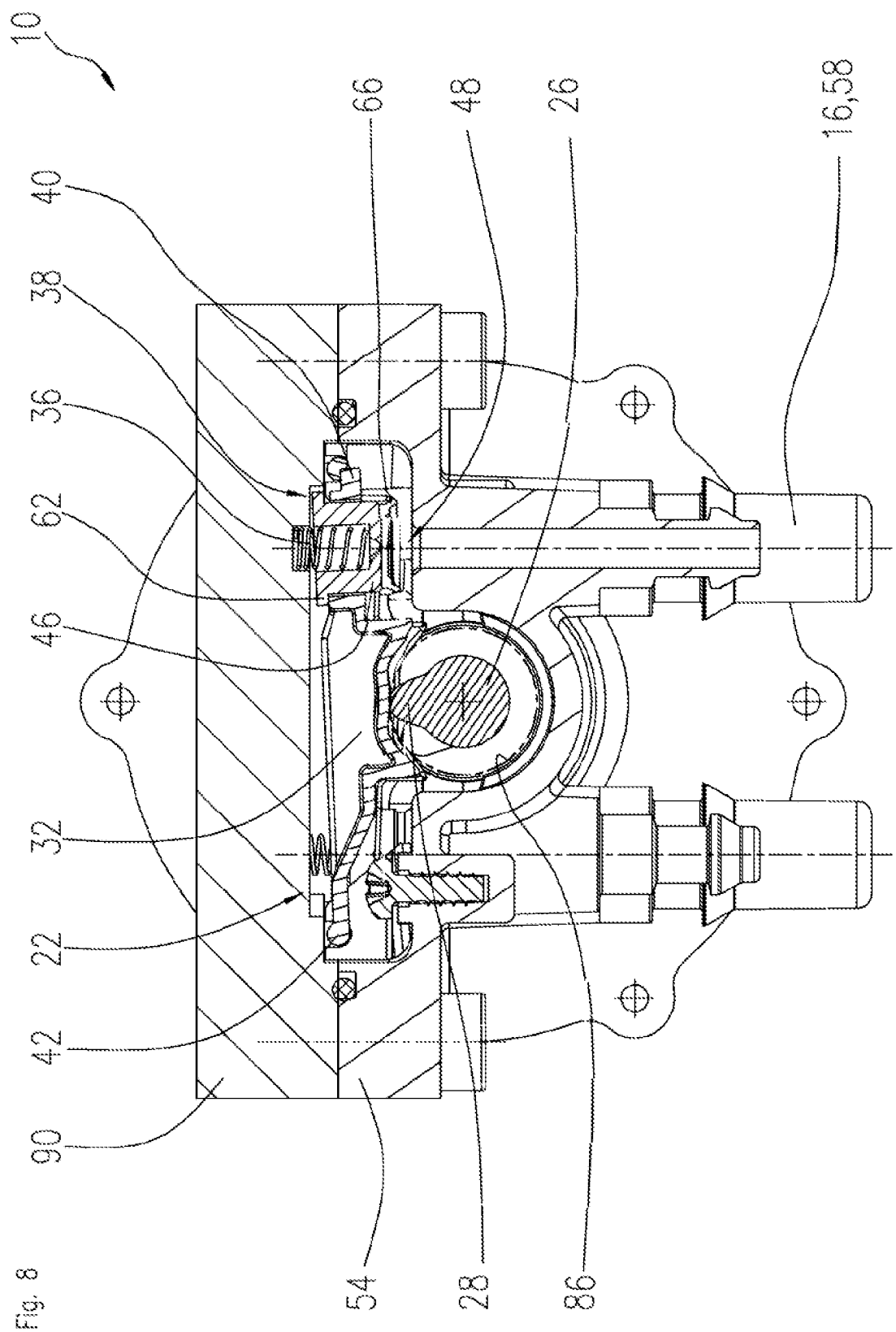
FIG. 8 shows a valve unit in the open position according to an example.

Moreover, the manifold unit 20 includes a camshaft 26 supported to be rotatable about a rotary axis 24 comprising a plurality of lobes 28 for operating the valve units 22. The camshaft 26 is supported to be rotatable within the fluid chamber 12, in particular, by means of plain bearings. The rotary axis 24 extends essentially perpendicular to an outlet direction of the fluid outlets 16. The camshaft 26 is arranged completely within the fluid chamber 12. The lobes 28 of the camshaft 26 are provided to open the valve units 22 as a function of a rotary position of the camshaft 26, and thus to open one of the fluid outlets 16. FIG. 7 shows a valve unit 22 in the closed state, and FIG. 8 shows a valve unit 22 in the open state.

During a rotary movement of the camshaft 26, the lobes 28 of the camshaft 26 act on the cam followers 32 of the valve units 22 as a function of a rotary position of the camshaft, thus causing lifting of the sealing units 38 from the fluid outlets 16 and therefore opening of the fluid outlets 16. The cam followers 32 of the valve units 22 are provided to lift the sealing units 38 against the spring force of the spring elements 36. For lifting the sealing units 38 from the fluid outlets 16, the lobes 28 of the camshaft 26 are provided to cause a tilting motion of the cam followers 32 of the valve units 22. The camshaft 26 is arranged below the cam followers 32 between the cam followers 32 and the housing lid 90. Each of the cam followers 32 has an operating contour 78, which is provided for cooperation with a lobe 28 of the camshaft 26. The operating contour 78 comprises a leading ramp 80, a trailing ramp 82 and a partially convex lifting region 84 facing toward the camshaft 26. Due to the configuration of the operating contour 78, the lifting function has the shape of a shortened cycloid. A convex portion 88 of the lifting region 84 protrudes into a lobe-height circle 86 of the lobes 28 of the camshaft 26. The leading ramp 80 and the trailing ramp 82 extend to be partially tangential to a lobe-height circle 86 of the lobes 28 of the camshaft 26. The leading ramp 80 and the trailing ramp 82 are identically shaped. Depending on the sense of rotation of the camshaft 26, the positions of the leading ramp 80 and the trailing ramp 82 may be exchanged.

During tilting of a cam follower 32 of a valve unit 22 about the tilting axis 42 caused by a lobe 28 of the camshaft 26, the tilting motion is transmitted to the seal carrier 46 by the receiver 40 of the cam follower 32 and thus causes a lifting motion of the sealing unit 38. During tilting of a cam follower 32 for opening a fluid outlet 16, an end face of each receiver 40 facing the engagement collar 62 of each sealing unit 38 engages the engagement collar 62 after reaching a predefined rotary angle, thus causing a lifting motion of the sealing unit 38 as the tilting continues. The end faces of the receivers 40 facing the engagement collar 62, in a closed state of the sealing units 38, for example extend obliquely to the engagement collars 62 of each sealing unit 38, so that the sealing unit 38 are at first lifted at one side during a lifting motion of the sealing units 38. Lifting-off of a sealing unit 38 during opening of a fluid outlet 16 is directly performed by the cam follower 32 of the valve unit 22 against the spring force of the spring element 36 of the sealing unit 38. Lowering of a sealing unit 38, as a fluid outlet 16 is closed, is primarily caused by the spring force of the spring element 36 acting on the sealing units 38, wherein the receiver 40 of the cam follower 32 only performs guiding of the sealing unit 38 during lowering.

The lobes 28 of the camshaft 26 are arranged, in particular, on the circumference of the camshaft 26 in such a manner that only one of the valve units 22 is open at any rotary position of the camshaft 26. The fluid outlets 16 are arranged along the axial direction 24 of the camshaft 26, wherein they are arranged laterally offset to the rotary axis 24 of the camshaft 26. The fluid outlets 16 are arranged in two rows 50, 52, which extend on opposite sides of the camshaft 26 at least essentially parallel to the rotary axis 24 of the camshaft 26. The fluid outlets 16 of the first rows 50 are arranged along an axial direction 24 of the camshaft 26 offset to the fluid outlets 16 of the second rows 52.

The manifold unit 20 comprises an electric motor which is provided to rotationally drive the camshaft 26. Only the rotor 44 is shown of the electric motor. The electric motor is formed, for example, as a brushless DC motor. In addition, the manifold unit 20 has a sensor unit, not shown, which is provided to detect a rotary position of the camshaft 26. The sensor unit can include, for example, three Hall sensors (not shown), which can be integrated in the control electronics. An evaluation electronics and/or evaluation software integrated, in particular, in the control electronics uses the measured values of the Hall sensors to determine the rotary position of the electric motor. To achieve this, each current rotary position of the electric motor can be stored in a non-volatile memory. A rotary motion of the electric motor is incrementally detected by the Hall sensors, and the new rotary position of the electric motor is determined. The initial rotary position of the electric motor can be stored in the non-volatile memory during installation of the fluid manifold apparatus 10. Since the camshaft 26 is mounted on the shaft 64 of the electric motor in a torsion-resistant manner the rotary position of the electric motor can also be used to determine the rotary position of the camshaft 26.

For the fluid manifold apparatus 10 shown in FIGS. 1 to 8, insertion of the sealing units 38 into the receivers 40 of the already installed cam followers 32 is performed from above while the housing lid 90 of the housing 92 is open. In the same way, the spring element 36 is inserted into the recesses 68 of the seal carriers 46 from above. Hereafter, the housing 92 is closed by means of the housing lid 90.

Figure 9:
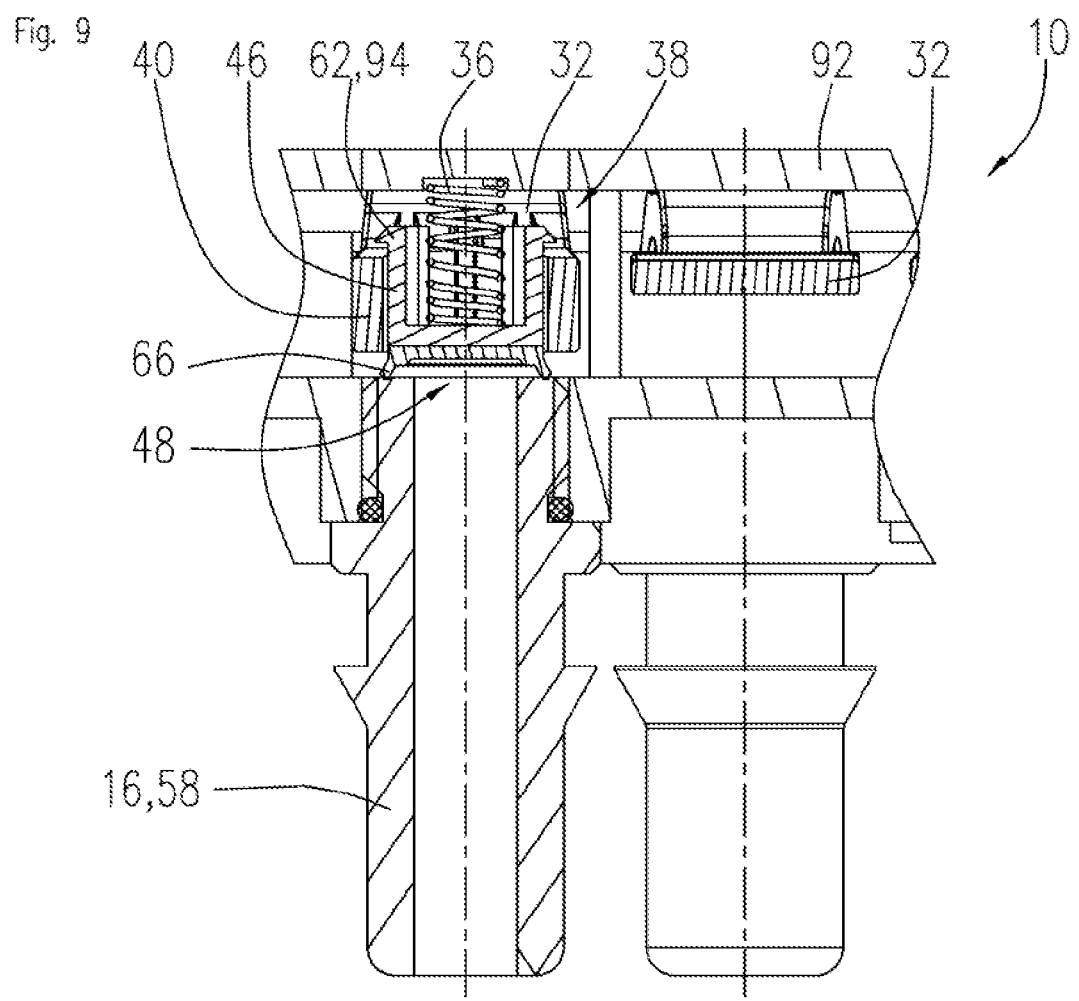
FIG. 9 shows a partial sectional view of an alternative fluid manifold apparatus.

FIG. 9 shows a partial sectional view of a fluid manifold apparatus 10, in which the insertion of the sealing units 38 into the receivers 40 of the cam followers 32 is performed from the direction of the fluid outlets 16. This can be advantageous, in particular, if the housing 92 has a one-piece configuration and thus does not include an openable housing lid. In this case, the camshaft 26 and the valve units 22 must be laterally inserted into the fluid chamber 12. To allow the sealing units 38 to be inserted, the housing 92 has recesses in the region of the fluid outlets 16 the diameter of which is larger than a diameter of the engagement collars 62 of the sealing units 38. The sealing units 38 are inserted into the fluid chamber 12, while the connecting pieces 58, including the spring element 36, are not mounted, and inserted into the recesses 40 of the cam followers 32. The engagement collar 62 is formed by a plurality of flexible snap arms 94, which are deflected as they are inserted into the receivers 40 of the cam followers 32, which enables insertion of the engagement collars 62 through the receivers 40 of the cam followers 32. After insertion of the sealing units 38, the connecting pieces 58 are installed.

Figure 10:
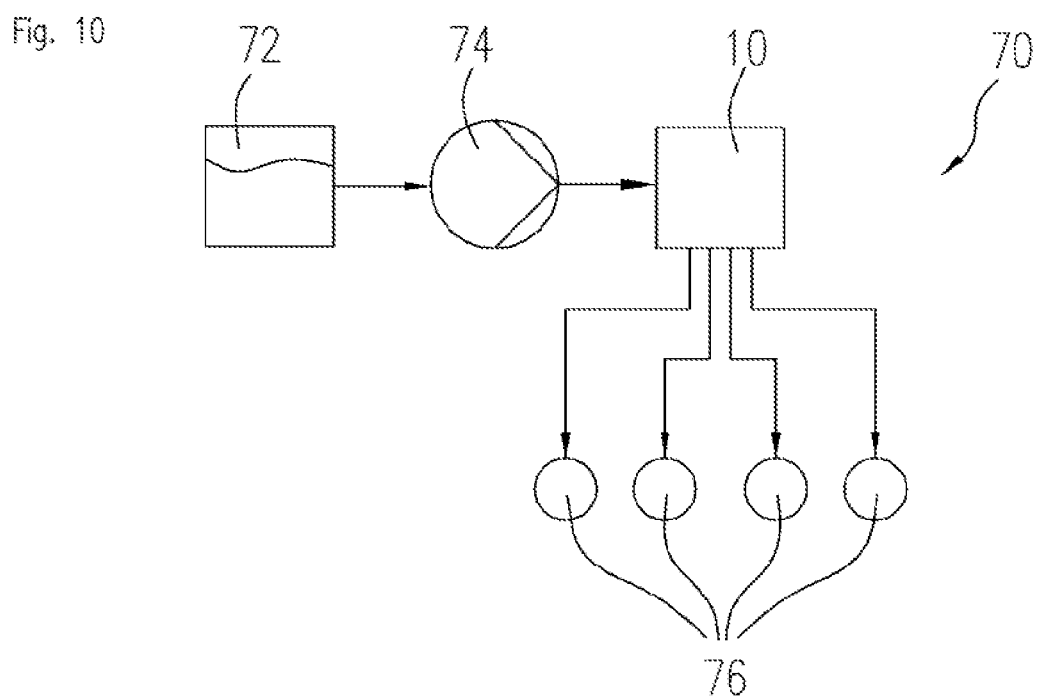
FIG. 10 shows a schematic view of a fluid distribution system comprising a fluid manifold apparatus according to an example.

FIG. 10 shows a schematic view of a fluid distribution system 70, in particular of a washer fluid distribution system of an automotive vehicle. The fluid distribution system 70 may comprise a fluid manifold apparatus 10 as described herein. The fluid distribution system 70, in addition to the fluid manifold apparatus 10, comprises a fluid tank 72 to provide the fluid, a fluid pump 74 to pump the fluid, and a plurality of consumers 76 of the fluid. The fluid distribution system 70, in the present example, has four consumers 76. In the case of a washer fluid distribution system of an automotive vehicle, the fluid tank 72 can be a water tank for holding washer fluid, the fluid pump 74 can be a water pump, and the consumers 76 can be, for example, windscreen washer systems, headlamp washer systems and/or sensor cleaning systems.

FIG. 11 shows a longitudinal sectional view of a fluid manifold apparatus 10. The fluid manifold apparatus 10 has two fluid chambers 12, each having one fluid inlet 14 and a plurality of fluid outlets 16 opening out into it. Each of the fluid chambers 12 is provided to at least temporarily receive a fluid to be distributed. Each of the fluids to be distributed is fed into one of the fluid chambers 12 via one of the fluid inlets 14.

Furthermore, the fluid manifold apparatus 10 comprises, for each of the fluid chambers 12, one manifold unit 20, at least largely arranged within the fluid chamber 12. The manifold units 20 correspond to the manifold unit 20 shown in FIGS. 3 and 4. Each of the manifold units 20 comprises a camshaft 26 supported to be rotatable about a rotary axis 24 having a plurality of lobes 28 for operating valve units 22 of the manifold units 20. The lobes 28 of the camshafts 26 are provided to open the valve units 22 of the manifold units 20 as a function of a rotary position of the camshafts 26. The camshafts 26 are connected to a shaft 64 of an electric motor in a torsion-resistant manner, which is provided to drive both camshafts 26 simultaneously. The use of two fluid chambers 12 enables two different fluids, in particular water and air, to be distributed simultaneously and, in particular to be mixed to improve a cleaning effect.

LIST OF REFERENCE NUMERALS 10 fluid manifold apparatus
12 fluid chamber
14 fluid inlet
16 fluid outlet
20 manifold unit
22 valve unit
24 rotary axis
26 camshaft
28 lobe
32 cam follower
34 axial direction
36 spring element
38 sealing unit
40 receiver
42 tilting axis
44 rotor
46 seal carrier
48 seal
50 row
52 row
54 housing tray
56 connecting piece
58 connecting piece
60 opening
62 engagement collar
64 shaft
66 sealing lip 68 recess
70 fluid distribution system
72 fluid tank
74 fluid pump
76 consumer
78 operating contour
80 leading ramp
82 trailing ramp
84 lifting region
86 lobe-height circle
88 portion
90 housing lid
92 housing
94 snap arm

What is claimed is:

1. A fluid manifold apparatus comprising a fluid chamber, at least one fluid inlet, a plurality of fluid outlets, and a manifold unit, including a plurality of valve units for closing the fluid outlets and a camshaft supported to be rotatable about a rotary axis, comprising a plurality of lobes for operating the valve units, wherein each of the valve units has a cam follower and a sealing unit, and the lobes of the camshaft are provided to lift the cam followers of the valve units as a function of a rotary position of the camshaft, wherein each of the cam followers has a receiver for receiving one sealing unit, wherein the sealing units are arranged to be linearly moveable in the receivers, wherein each of the cam followers has an operating contour provided to cooperate with a lobe of the camshaft, wherein the operating contour includes a leading ramp, a trailing ramp and an at least partially convex lifting region facing in the direction toward the camshaft.

2. The fluid manifold apparatus according to claim 1, wherein the receivers are formed to be annular.

3. The fluid manifold apparatus according to claim 1, wherein each of the sealing units includes a cylindrical seal carrier, which is provided for arrangement within the receivers of the cam follower, and a seal arranged on the seal carrier.

4. The fluid manifold apparatus according to claim 2, wherein an outer diameter of the cylindrical seal carrier of the sealing units is smaller than an inner diameter of the receivers of the cam followers.

5. The fluid manifold apparatus according to claim 3, wherein each of the sealing units includes an engagement collar arranged on an end of the seal carrier-opposite the seal and having an outer diameter that is larger than the inner diameter of the receivers of the cam followers.

6. The fluid manifold apparatus according to claim 3, wherein the seals of the sealing units are formed to be disc-shaped and have a circumferential sealing lip provided, in a sealing state, to fully encircle, in the circumferential direction, the fluid outlet to be closed.

7. The fluid manifold apparatus according to claim 3, wherein each of the valve units includes at least one spring element provided to apply a spring force to the seal carrier of each sealing unit acting in a direction toward a fluid outlet.

8. The fluid manifold apparatus according to claim 7, wherein the seal carriers of the sealing units include a recess provided to receive one end of a spring element.

9. The fluid manifold apparatus according to claim 8, wherein the leading ramp and the trailing ramp at least partially extend tangential to a lobe-height circle of the lobes of the camshaft.

10. The fluid manifold apparatus according to claim 1, wherein a convex portion of the lifting region protrudes into a lobe-height circle of the lobes of the camshaft.

11. The fluid manifold apparatus according to claim 1, wherein the manifold unit includes an electric motor provided to rotationally drive the camshaft.

12. A fluid distribution system comprising at least one fluid manifold apparatus according to claim 1.

13. A water distribution apparatus including the fluid manifold apparatus of claim 1.

14. The fluid distribution system of claim 13 wherein the fluid is a washer fluid of an automotive vehicle.

15. An automotive vehicle including the fluid distribution system of claim 13.

* * * * *